UNITED STATES PATENT OFFICE.

ERNST HEILIGENDÖRFER, OF CANELAS, MEXICO.

CHLORIDIZING SILVER ORES.

SPECIFICATION forming part of Letters Patent No. 597,238, dated January 11, 1898.

Application filed March 29, 1897. Serial No. 629,822. (No specimens.)

*To all whom it may concern:*

Be it known that I, ERNST HEILIGENDÖRFER, a citizen of Germany, residing at Canelas, Estado de Durango, Mexico, have invented an Improvement in Chloridizing Silver Ores; and I hereby declare the following to be a full, clear, and exact description of the same.

My invention relates to a process for chloridizing silver ores by which I am enabled to save a larger quantity of the precious metals and to overcome the objections to a combination of chlorination and amalgamation and those attendant upon what is known as the "chloridizing roasting process."

My invention consists in subjecting the ore, either raw or oxidized, to the action of copper chlorid or cuprous chlorid in conjunction with chlorid of sodium in hot solution and in certain details which will be more fully explained by reference to the following specification.

In the chlorination of silver ores as practiced in the copper-kettle or patio processes the procedure has always been a combination of chlorination and amalgamation and is a very delicate process, because a slight overcharge of copper chlorid will chloridize and destroy the quicksilver. For this reason the iron amalgamating-pan has been preferred, because no quicksilver is chloridized therein; but, on the other hand, neither is any silver chloridized, because the iron at once decomposes the copper chlorid. Therefore such ore as cannot be amalgamated raw needs a previous chlorination, which is usually produced by roasting with salt. The objection to this latter process is, first, it produces silver of a low degree of fineness. If the ore is a gold-bearing silver ore, the gold will be rendered more or less unfit for treatment by amalgamation or lixiviation, and great values of gold are thus lost. Second, it forms many volatile chlorids of base metals, all of which, especially the chlorids of antimony and arsenic, carry off some silver chlorid with them, and thus cause a considerable loss of silver by volatilization. Third, as the chloridizing roast is always accompanied by oxidation a certain amount of silver antimonate and arsenate will be formed, and these salts cannot be chloridized in the roasting-furnace or amalgamated in the iron pan, and they are but little soluble in lixiviation. This chloridizing roast also takes a large quantity of salt, which is somewhat expensive.

In my invention I employ copper chlorid ($CuCl$) and cuprous chlorid ($Cu_2Cl$) together with a hot solution of common salt or chlorid of sodium. A watery solution of salt and copper sulfate (blue-stone) is promptly converted into copper chlorid and sodium sulfate. The copper chlorid ($CuCl$) is efficient in the operation, while the sodium sulfate is indifferent and has no effect upon the process. If the solution of copper chlorid in salt water is boiled with metallic copper, the latter will be dissolved and cuprous chlorid ($Cu_2Cl$) is formed, and this is the main agent in chloridizing the combinations of silver. Cuprous chlorid is but little soluble in cold water, but becomes soluble in hot brine. Therefore a surplus of salt and boiling heat are necessary to shorten the time of chlorination. This chlorination must be carried on in wooden or stone vessels, because an iron vessel would destroy the copper chlorid, as previously stated. It may also be found that the chlorination can be performed in a leaching-vat so arranged as to introduce steam, or in a wooden tub, with suitable stirring apparatus.

There are numerous and complicated combinations of silver with other elements which have hitherto presented great difficulties in separating and saving the silver contained therein. These elements are reduced to a small number of single combinations when the silver ore is first oxidized, and this can be best done by the oxidizing roast without salt. Practically every silver mineral except some rare varieties when properly oxidized is converted either into silver sulfate and metallic silver or into antimonate and arsenate of silver.

My invention consists, essentially, in producing reactions with rebellious silver ores by means of copper or cuprous chlorid, which will allow the chloridized pulp to be operated upon subsequently, either by pan amalgamation or by lixiviation. The rebellious ores—that is, such ores as cannot be chloridized raw—are by previous oxidation converted into metallic silver, silver sulfate, and silver antimonate or arsenate. Silver sulfate is chloridized by a watery solution of salt, resulting in silver chlorid and sodium sulfate. Silver antimonate and arsenate are chloridized by cuprous chlorid, which results in silver chlorid and copper antimonate or arsenate. When the oxidizing roast forms a sufficient quantity of metallic silver in the roasted ore, no copper is wanted—that is, copper chlorid can be used instead of cuprous chlorid, because silver and copper chlorids become silver chlorid and cuprous chlorid and the cuprous chlorid will chloridize the silver antimonate and arsenate.

The advantages obtained by the chlorination with copper and cuprous chlorid aided by previous oxidation are, first, an oxidizing roast preceding the chlorination forms oxids or insoluble salts of the base metals, which are first indifferent against copper and cuprous chlorid and are also indifferent against quicksilver and the solvents used in lixiviation, and therefore fine silver and gold will be produced by this method; second, when rebellious gold-bearing silver ores are first oxidized and then chloridized with copper and cuprous chlorid the gold will be left in a pure metallic state and the silver as silver chlorid—that is, both precious metals are in the best condition for further treatment; third, the oxidizing roast forms what may be termed "fireproof" antimonate and arsenate of silver—that is, they are not easily volatilized—and therefore the losses of silver by volatilization are thus avoided or diminished; fourth, the formation of silver antimonate and arsenate is thus not a disadvantage, as it is in the chloridizing roast, because my process will not leave a part of them unchloridized. It gives a higher chlorination than can be possibly reached by chloridizing roasting. The latter also needs a large quantity of salt, while my chlorination with copper and cuprous chlorid requires a comparatively small quantity.

Practically by my process I am enabled to chloridize every kind of rebellious silver ore and also the matte of smelting-furnaces containing silver.

Having thus described my invention, what I claim as new, and desire to secure by Letters Patent, is—

The process herein described for chloridizing naturally or metallurgically oxidized silver ores and the matte of smelting-furnaces for subsequent amalgamation in the iron pan or for lixiviation, consisting in subjecting the same at an elevated temperature to the action of copper chlorid (which is also called cupric chlorid, $CuCl_2$) and of cuprous chlorid, dissolved in brine.

In witness whereof I have hereunto set my hand.

ERNST HEILIGENDÖRFER.

Witnesses:
LIBRADO SILVA,
MANUEL OSORIO.